United States Patent
Phua et al.

(10) Patent No.: US 10,724,566 B2
(45) Date of Patent: *Jul. 28, 2020

(54) THREADED FASTENER

(71) Applicant: INFASTECH INTELLECTUAL PROPERTIES PTE. LTD., Singapore (SG)

(72) Inventors: Cheng Siong Phua, Singapore (SG); Senthil Kumaran Kothandaraman, Cuddalore (IN)

(73) Assignee: Infastech Intellectual Properties Pte. Ltd., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 16/224,893

(22) Filed: Dec. 19, 2018

(65) Prior Publication Data

US 2019/0120273 A1 Apr. 25, 2019

Related U.S. Application Data

(62) Division of application No. 15/224,369, filed on Jul. 29, 2016, now Pat. No. 10,197,086.

(60) Provisional application No. 62/199,416, filed on Jul. 31, 2015.

(51) Int. Cl.
| *F16B 35/04* | (2006.01) |
| *F16B 25/00* | (2006.01) |
| *F16B 33/02* | (2006.01) |
| *F16B 39/30* | (2006.01) |

(52) U.S. Cl.
CPC ...... *F16B 25/0073* (2013.01); *F16B 25/0084* (2013.01); *F16B 33/02* (2013.01); *F16B 35/04* (2013.01); *F16B 39/30* (2013.01)

(58) Field of Classification Search
CPC .............. F16B 25/0036; F16B 25/0042; F16B 25/0073; F16B 25/0084; F16B 33/02; F16B 35/04; F16B 39/30
USPC ......................................................... 411/411
See application file for complete search history.

(56) References Cited

U.S. PATENT DOCUMENTS

| 4,549,754 A | * | 10/1985 | Saunders | .............. E21B 17/042 |
| | | | | 285/334 |
| 5,413,445 A | * | 5/1995 | Cartellone | .............. B66C 1/125 |
| | | | | 294/89 |
| 7,731,466 B2 | * | 6/2010 | Shea | ....................... F16B 39/30 |
| | | | | 411/308 |

(Continued)

FOREIGN PATENT DOCUMENTS

| CN | 2900898 | 5/2007 |
| CN | 201074626 | 6/2008 |

(Continued)

*Primary Examiner* — Roberta S Delisle
(74) *Attorney, Agent, or Firm* — Lorraine Hernandez; Kegler, Brown, Hill + Ritter Co., LPA

(57) ABSTRACT

Thread profiles providing multi-point contact improving the vibration resistance of the threaded fastener, and thereby greatly reducing the need for fastener coatings, such as nylon patches. In various embodiments, the threaded faster may have a threaded portion configured to engage two or three points of a mating thread, and the threaded portion has a thread defined by a crest portion, a leading flank, at least one root portion, and a trailing flank, all of which may be oriented at angle relative to the normal axis.

23 Claims, 8 Drawing Sheets

(56) References Cited

U.S. PATENT DOCUMENTS

| | | | |
|---|---|---|---|
| 8,382,414 B2* | 2/2013 | Vandenberg | F16B 25/0015 411/386 |
| 2009/0116929 A1* | 5/2009 | Shea | F16B 39/30 411/311 |

FOREIGN PATENT DOCUMENTS

| | | |
|---|---|---|
| CN | 201184353 | 1/2009 |
| CN | 203856856 | 10/2014 |

* cited by examiner

THREADED FASTENER

This application is a divisional application of and claims priority to U.S. patent application Ser. No. 15/224,369, filed on Jul. 29, 2016, which claims priority to U.S. Provisional Application Ser. No. 62/199,416, filed on Jul. 31, 2015, both applications are herein incorporated by reference.

BACKGROUND AND SUMMARY

The present invention relates generally to threaded fasteners of any size, and more particularly to vibration resistant threaded fasteners.

Threaded fasteners such as screws are used in many applications to connect one component or part to another. Many screws are installed through a portion of one component and threaded into a second component to clamp the components together. Many component shapes and configurations have been contemplated for retaining a threaded fastener, such as a blind or through hole formed in the component for engaging the threads of the fastener. The blind or through hole may be provided in an embossment or may be provided in the component material thickness. Often the blind or through hole is threaded to mate with the threaded fastener.

Many applications including automotive, electronic, and consumer products require threaded fasteners that maintain desired clamping forces through vibration and other in-use loads. A common problem with prior fasteners included loosening under vibration. Other prior fasteners stripped too easily during installation providing reduced clamping and premature assembly failure. Certain prior fasteners create excessive radial stress around the hole during installation, particularly in an embossment, that weakens the component and may cause premature assembly failure.

Fastener coatings have been developed to compensate for some of the failures of prior fasteners, such as thread-sealing adhesives, thread lubricants, anti-vibration coatings, and patches of nylon or similar materials. However, thread coatings require additional material cost and application cost, and are increasingly difficult to apply as fastener sizes become smaller. There remains a need for a threaded fastener that overcomes these and other disadvantages of the prior art.

We have found that new thread profiles that provide multi-point contact improve the vibration resistance of the threaded fastener, and thereby greatly reduce and may eliminate the need for fastener coatings, such as nylon patches.

Therefore, what is disclosed is a threaded fastener with improved vibration resistance. The threaded fastener includes a first end, a second end, and a threaded portion extending between the first end and the second end. The threaded fastener also has a longitudinal axis extending through the fastener from the first end to the second end, and a normal axis extending perpendicular to the longitudinal axis.

In various embodiments, the threaded faster has a threaded portion configured to engage two or three points of a mating thread, and the threaded portion has a thread defined by, in series, a crest portion oriented at an angle of 10° to 20° relative to the longitudinal axis, a leading flank oriented at an angle of 20° to 30° relative to the normal axis, a root portion oriented at an angle of 25° to 35° relative to the longitudinal axis, and a trailing flank oriented at angle of 15° to 25° relative to the normal axis.

In one embodiment, the threaded fastener has a threaded portion configured to engage three points of a mating thread, and the threaded portion has a thread defined by, in series, a crest portion oriented at an angle of −5° to 5° relative to the longitudinal axis, a leading flank oriented at an angle of 30° to 40° relative to the normal axis, a root portion oriented at an angle of 22° to 32° relative to the longitudinal axis, and a trailing flank oriented at angle of 17° to 27° relative to the normal axis. In other embodiments, the thread is defined by, in series, the crest portion oriented at an angle of approximately 0° relative to the longitudinal axis, the leading flank oriented at an angle of approximately 35° relative to the normal axis, the root portion oriented at an angle of approximately 27° relative to the longitudinal axis, and the trailing flank oriented at an angle of approximately 22° relative to the normal axis. In yet other embodiments, the crest portion, the leading flank, the root portion, and the trailing flank may be oriented at +/−1° or +/−2.5° from the angles previously noted.

In another embodiment, the threaded fastener has a threaded portion configured to engage two points of a mating thread, and the threaded portion has a thread defined by, in series, a crest portion oriented at an angle of 10° to 20° relative to the longitudinal axis, a leading flank oriented at an angle of 20° to 30° relative to the normal axis, a root portion oriented at an angle of 25° to 35° relative to the longitudinal axis, and a trailing flank oriented at an angle of 15° to 25° relative to the normal axis. In other embodiments, the thread is defined by, in series, the crest portion oriented at an angle of approximately 15° relative to the longitudinal axis, the leading flank oriented at an angle of approximately 25° relative to the normal axis, the root portion oriented at an angle of approximately 30° relative to the longitudinal axis, and the trailing flank oriented at angle of approximately 20° relative to the normal axis. In yet other embodiments, the crest portion, the leading flank, the root portion, and the trailing flank may be oriented at +/−1° or +/−2.5° from the angles previously noted.

In another embodiment, the threaded fastener has a threaded portion configured to engage two points of a mating thread, and the threaded portion has a thread defined by, in series, a crest portion oriented at an angle of −5° to 5° relative to the longitudinal axis, a leading flank oriented at an angle of 25° to 35° relative to the normal axis, a first root portion oriented at an angle of −5° to 5° relative to the longitudinal axis, a second root portion oriented at an angle of 35° to 45° relative to the longitudinal axis, and a trailing flank oriented at angle of 21° to 29° relative to the normal axis. In other embodiments, the thread is defined by, in series, the crest portion oriented at an angle of approximately 0° relative to the longitudinal axis, the leading flank oriented at an angle of approximately 30° relative to the normal axis, the first root portion oriented at an angle of approximately 0° relative to the longitudinal axis, the second root portion oriented at an angle of approximately 40° relative to the longitudinal axis, and the trailing flank oriented at angle of approximately 24° relative to the normal axis. In yet other embodiments, the crest portion, the leading flank, the root portion, and the trailing flank may be oriented at +/−1° or +/−2.5° from the angles previously noted.

In some embodiments, the second end of the threaded fastener is tapered. In an embodiment, the major diameter of the crest portion of the threaded portion tapers at approximately 30° over at least the last two revolutions of the threaded portion adjacent the second end.

The presently disclosed threaded fastener may be internally or externally threaded. In addition, the threaded fastener may include internal or external driver surfaces. In one embodiment the threaded fastener has a recess into a shank which defines internal drive surfaces. In yet other embodiments, the threaded fastener includes a radially extending surface with a plurality of serrations.

BRIEF DESCRIPTION OF THE DRAWINGS

Reference is made to the accompanying drawings in which particular embodiments are illustrated as described in more detail in the description below, in which.

DETAILED DESCRIPTION

Figure 1:
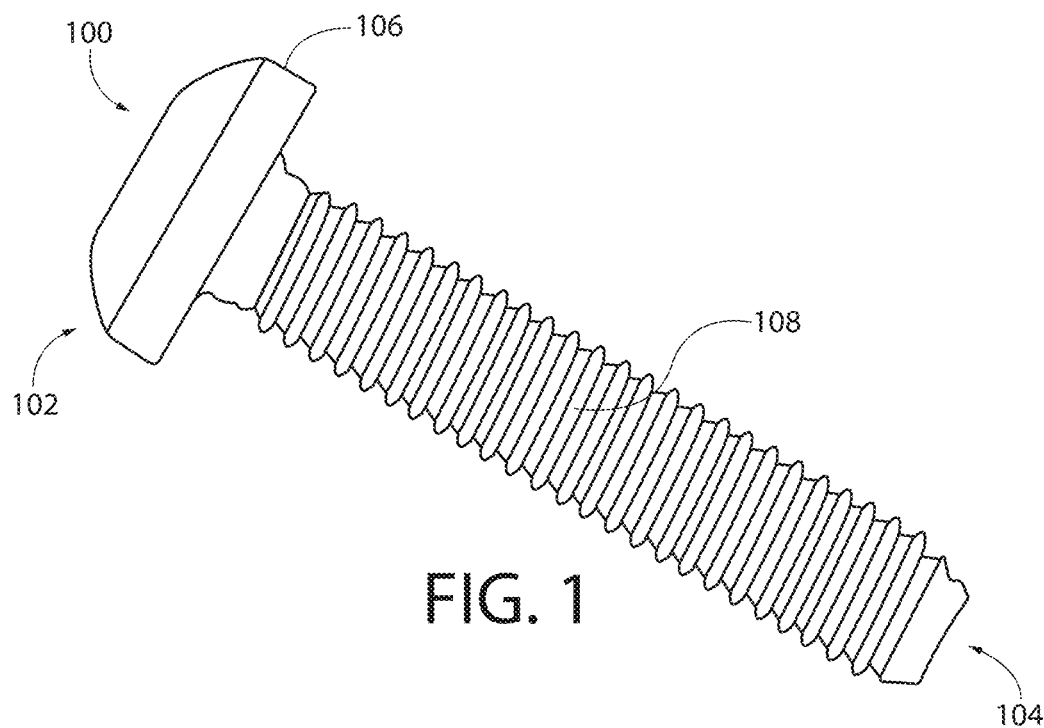
FIG. 1 is a perspective view a threaded fastener.

Referring now to FIGS. 1-11, embodiments of the presently disclosed threaded fastener are illustrated. As shown in FIG. 1, a threaded fastener 100 includes a threaded portion 108 extending from a first end 102 to a second end 104. The second end 104 may alternatively be referred to as the lead end of the fastener based upon the driving direction D of the fastener. In one embodiment, the threaded fastener is a screw having a head 106. The threaded portion 108 is defined by a helical thread extending around an elongated shank that extends from the head 106 to the second end 104. As described further below, the thread is defined by at least a crest portion, a leading flank, a root portion, and a trailing flank. The configuration of the thread may be defined by reference to a longitudinal axis and/or a normal axis of the threaded fastener. The longitudinal axis extends through the fastener from the first end to the second end, whereas the normal axis extends perpendicular to the longitudinal axis.

Figure 2:
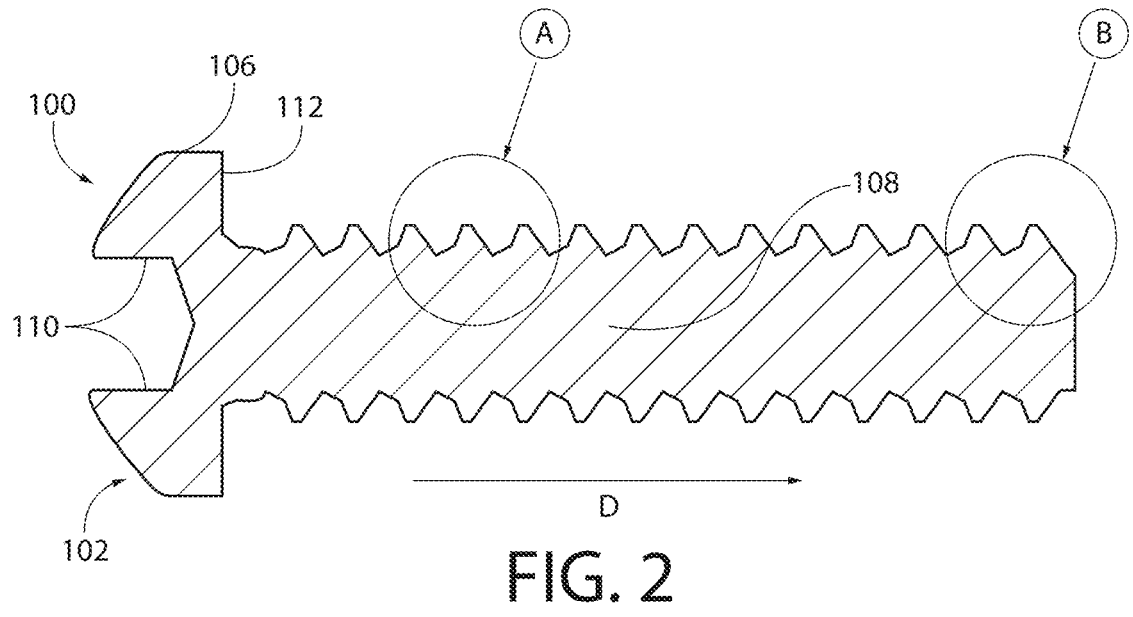
FIG. 2 is a cross-section view of the threaded fastener of FIG. 1.

Referring now to FIG. 2, a cross-section of the threaded fastener 100 is illustrated. As shown, the thread portion 108 extends along the elongated shank with the helical thread repeating in cross-section, with the adjacent threads axially separated by the distance of the pitch. In an embodiment, the head 106 of the fastener includes internal drive surfaces 110 configured to receive a driver for transmitting torque to the fastener. In other embodiments, the head may include external drive surfaces. In yet other embodiments, the threaded fastener may be a headless screw, in which the first end includes a recess into the shank and the recess in the shank includes drive surfaces.

Figure 9:
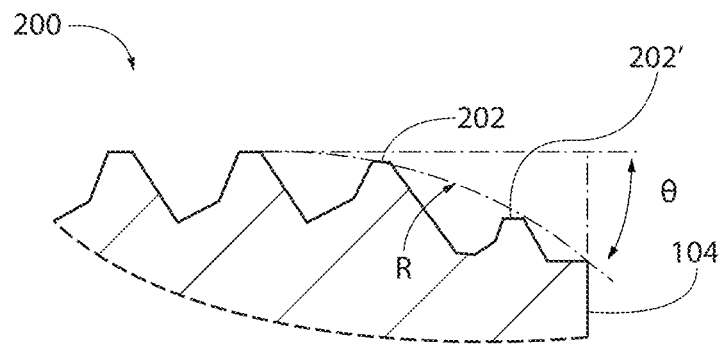
FIG. 9 is a detail view of a second end portion of the first embodiment of a threaded fastener.
Figure 10:
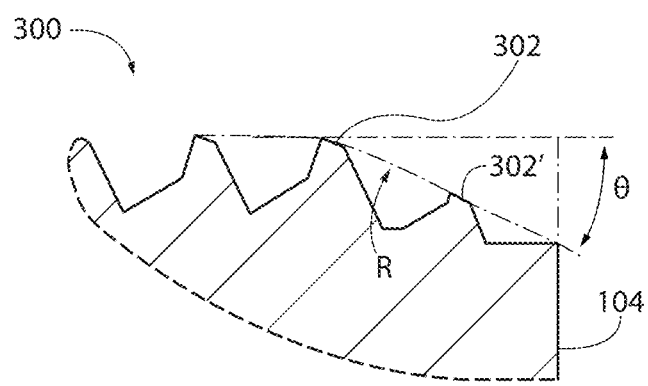
FIG. 10 is a detail view of a second end portion of the second embodiment of a threaded fastener.
Figure 11:
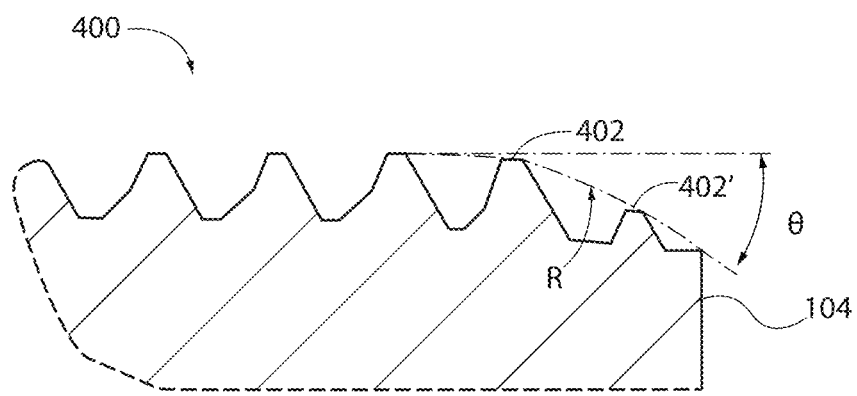
FIG. 11 is a detail view of a second end portion of the third embodiment of a threaded fastener.

The configuration of the thread may provide improved vibration resistance as compared to previously available fasteners, while also reducing or eliminating the need for patches or other anti-vibration measures. FIGS. 3-8 illustrate embodiments of the thread identified by Detail A in FIG. 2 that provide improved vibration resistance. FIGS. 9-11 illustrate embodiments of the second end identified by Detail B. The thread configurations described below are described in the context of an externally threaded screw, such as illustrated in FIGS. 1-2. The presently disclosed threaded fastener, however, encompasses externally threaded fasteners (e.g. screws, bolts, etc.) as well as internally threaded fasteners (e.g. nuts), as well as fastening systems that mate internally and externally threaded fasteners, where one or both of the fasteners is configured in accordance with this disclosure. In one embodiment, one fastening component has a thread configured in accordance with this disclosure, and the mating fastening component has a 60° symmetric thread profile, such as those defined by relevant standards including ISO 68, ISO 261, ISO 262, and ASME/ANSI B1, which are incorporated herein by reference.

Referring now to FIGS. 3-8, the configuration of the thread is illustrated for embodiments of the threaded fastener. The thread includes a crest portion, a leading flank, a root portion, and a trailing flank. The crest portion defines the major diameter of the threaded portion, and is defined in profile by an angle between the crest portion and the longitudinal axis of the fastener, also referred to as a crest angle δ. The leading flank is angled towards the lead end and is defined in profile by an angle between the leading flank and the normal axis (i.e. a plane normal to the longitudinal axis of the fastener), also referred to as the lead angle α. The root portion defines the minor diameter of the threaded portion and is defined in profile by an angle between the root portion and the longitudinal axis of the fastener, also referred to as the root angle ρ. The trailing flank is angled towards the first end (e.g. head) of the fastener, and is defined in profile by an angle between the trailing flank and the normal axis (i.e. a plane normal to the longitudinal axis of the fastener), also referred to as the trail angle β.

Figure 3:
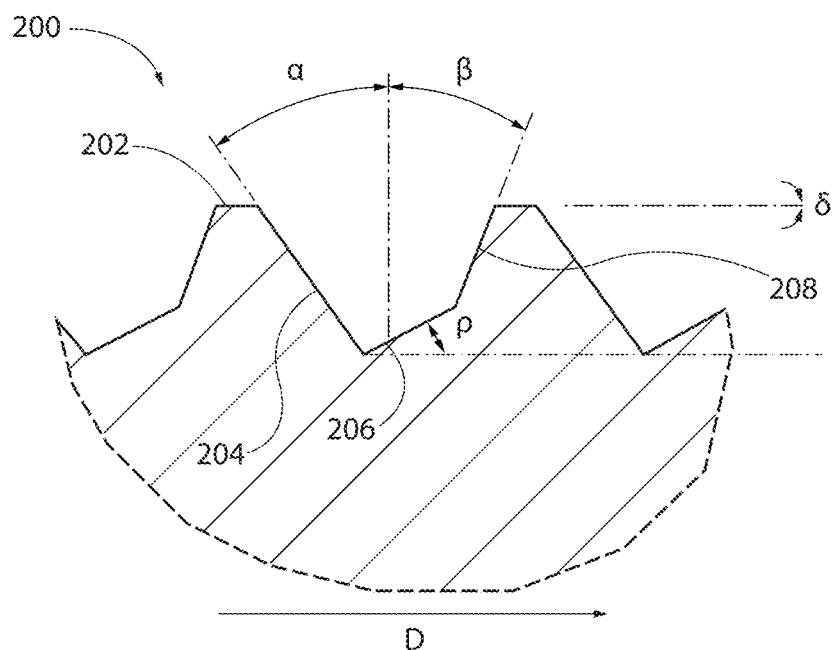
FIG. 3 is a detail view of a threaded portion of a first embodiment of a threaded fastener.
Figure 4:
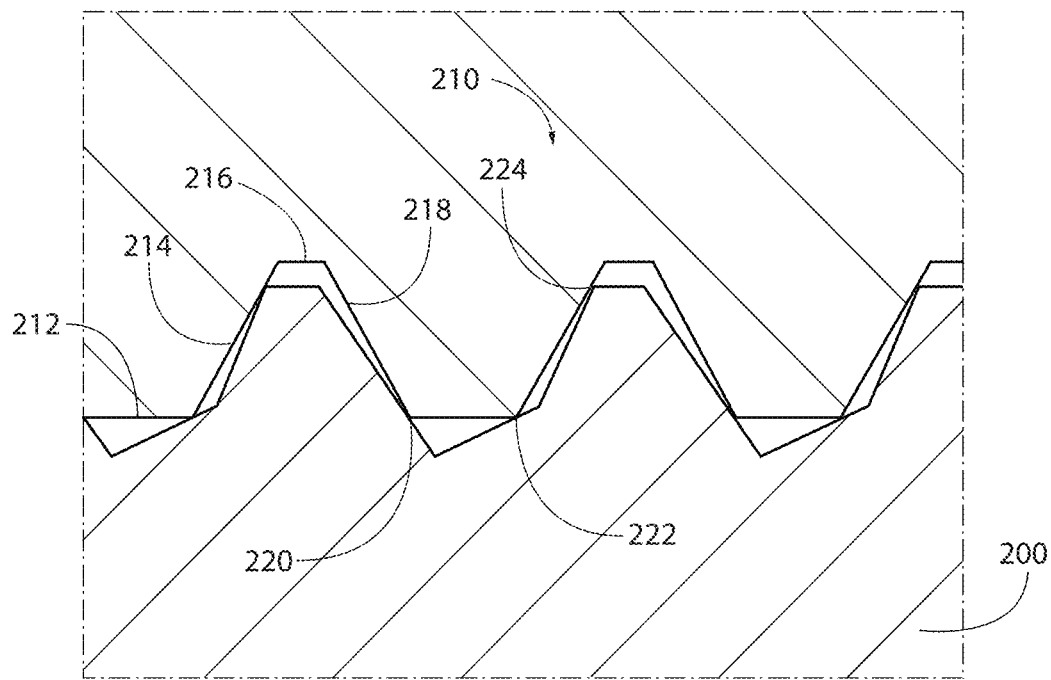
FIG. 4 is a detail view of the first embodiment of a threaded fastener engaged to a component.

Referring now to FIGS. 3-4, a thread 200 of a first embodiment of a threaded fastener is illustrated. The crest portion 202 oriented at a crest angle δ of approximately −5° to 5° relative to the longitudinal axis of the fastener. The crest angle δ may also be approximately 0°. The leading flank 204 is oriented at a lead angle α of approximately 25° to 45° relative to the normal axis of the fastener. The lead angle α may also range from 30° to 40°, 32° to 38°, 34° to 36°, or is approximately 35°. The root portion 206 is oriented at a root angle ρ of approximately 17° to 37° relative to the longitudinal axis of the fastener. The root angle ρ may also range from 20° to 34°, 22° to 32°, 24° to 30°, 26° to 28°, or is approximately 27°. The trailing flank 208 is oriented at trail angle β of approximately 12° to 32° relative to the normal axis. The trail angle β may also range from 14° to 30°, 16° to 28°, 18° to 26°, 20° to 24°, or is approximately 22°.

Referring to FIG. 4, the thread 200 provides three-point contact with a mating thread 210, which improves the vibration resistance of the threaded fastener. For purposes of illustration, the mating thread 210 is illustrated by a symmetric thread having a crest portion 212, a first flank 214, a root portion 216, and a second flank 218. The first flank 214 and the second flank 218 are oriented at approximately 60° relative to the normal axis, while the crest portion 212 and root portion 216 are oriented at approximately 0° relative to the longitudinal axis. This configuration is common in commercially available screws and nuts.

When the thread 200 is mated with the mating thread 210, the configuration of the thread 200 results in three points of contact as shown in FIG. 4. The leading flank 204 of the thread 200 contacts the crest portion 212 of the mating thread 210 at a first contact point 220. The root portion 206 of the thread 200 contacts the crest portion 212 of the mating thread 210 at a second contact point 222. The crest portion 202 of the thread 200 contacts the first flank 214 of the mating thread 210 at a third contact point 224. As will be apparent, each of the contact points between the thread and the mating thread extend helically along the length of the threaded fastener further improving the stability and vibration resistance.

The multi-point contact between the thread 200 and the mating thread 210 improves the vibration resistance of the threaded fastener by limiting vibration induced movement. By locking the crest portion of the thread with the mating thread, and locking the root portion of the thread with the mating thread, the potential for movement as a result of vibration is significantly reduced. In contrast, a conventional thread having symmetric 60° leading and trailing flanks, contacts the mating thread only along the flanks leaving significant radial clearance at both the crest and root. That radial clearance permits vibration induced movement which results in loosening of the fastener as shown in the test results below.

Figure 5:
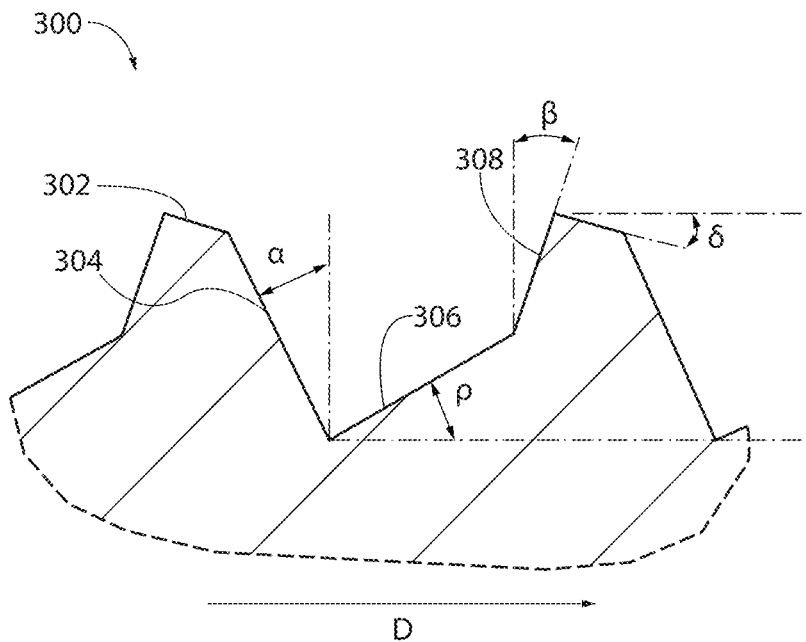
FIG. 5 is a detail view of a second embodiment of a threaded portion of a threaded fastener.
Figure 6:
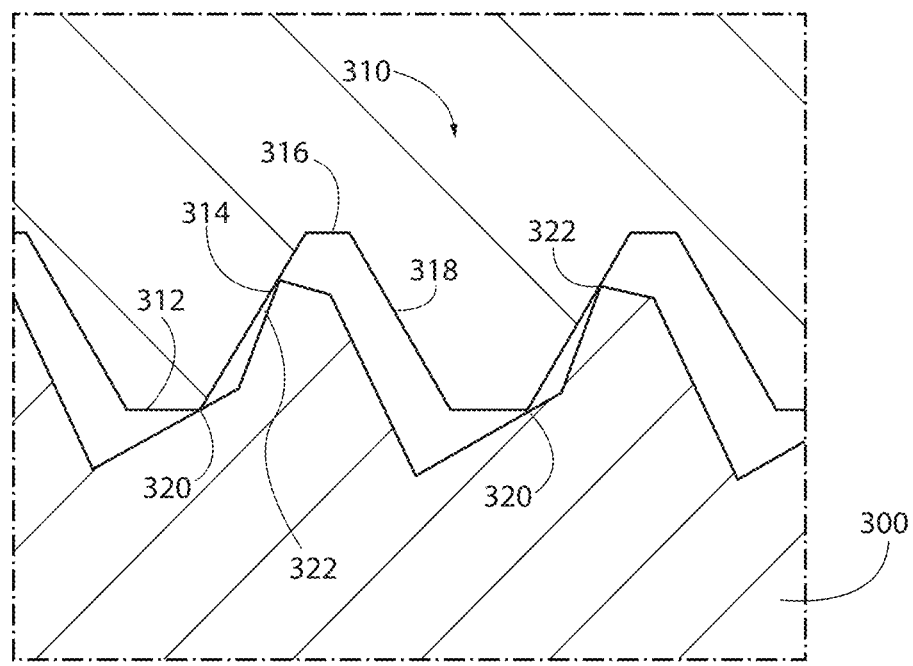
FIG. 6 is a detail view of the second embodiment of a threaded fastener engaged to a component.

Referring now to FIGS. 5-6, a thread 300 of a second embodiment of a threaded fastener is illustrated. The crest portion 302 oriented at a crest angle δ of approximately 5° to 25° relative to the longitudinal axis of the fastener. The crest angle δ may also range from 7° to 23°, 9° to 21°, 11° to 19°, 13° to 17°, or approximately 15°. The leading flank 304 is oriented at a lead angle α of approximately 15° to 35° relative to the normal axis of the fastener. The lead angle α may also range from 17° to 32°, 19° to 30°, 21° to 28°, 23° to 26°, or may be approximately 25°. The root portion 306 is oriented at a root angle β of approximately 20° to 40° relative to the longitudinal axis of the fastener. The root angle β may also range from 22° to 38°, 24° to 36°, 26° to 34°, 28° to 32°, or may be approximately 30°. The trailing flank 308 is oriented at trail angle β of approximately 10° to 30° relative to the normal axis. The trail angle β may also range from 12° to 28°, 14° to 26°, 16° to 24°, 18° to 22°, or may be approximately 20°.

Referring to FIG. 6, the thread 300 provides two-point contact with a mating thread 310, which improves the vibration resistance of the threaded fastener. For purposes of illustration, the mating thread 310 is illustrated a symmetric thread having a crest portion 312, a first flank 314, a root portion 316, and a second flank 318. The first flank 314 and the second flank 318 are oriented at approximately 60° relative to the normal axis, while the crest portion 312 and root portion 316 are oriented at approximately 0° relative to the longitudinal axis. This configuration is common in commercially available screws and nuts.

When the thread 300 is mated with the mating thread 310, the configuration of the thread 300 results in two points of contact as shown in FIG. 6. The root portion 306 of the thread 300 contacts the crest portion 312 of the mating thread 310 at a first contact point 320. The crest portion 302 of the thread 300 contacts the first flank 314 of the mating thread 310 at a second contact point 322.

As described above, the multi-point contact between the thread 300 and the mating thread 310 improves vibration resistance of the threaded fastener by limiting vibration induced movement. By locking both the crest portion and the root portion of the thread with the mating thread, the potential for movement as a result of vibration is significantly reduced as shown by the test results below.

Figure 7:
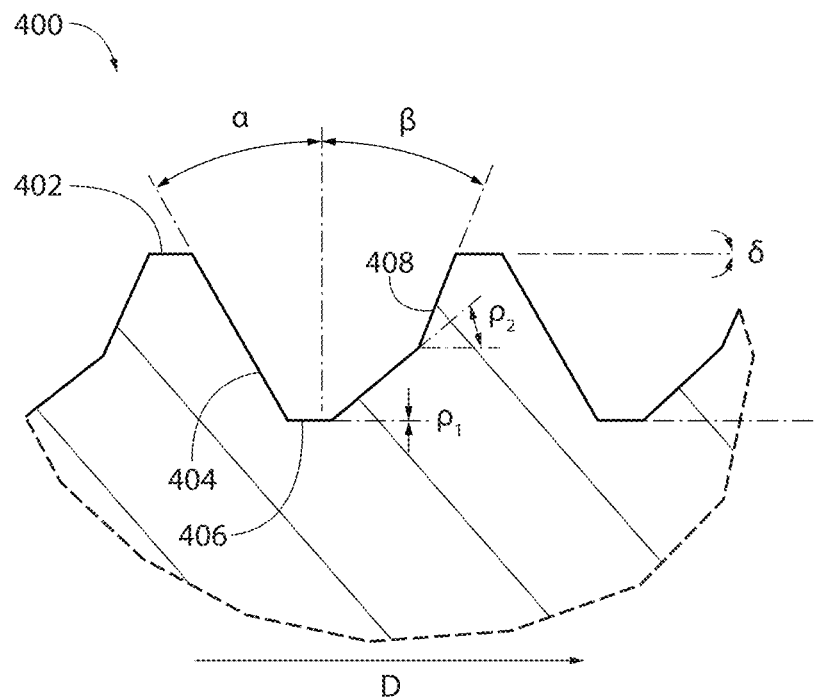
FIG. 7 is a detail view of a third embodiment of a threaded portion of a threaded fastener.
Figure 8:
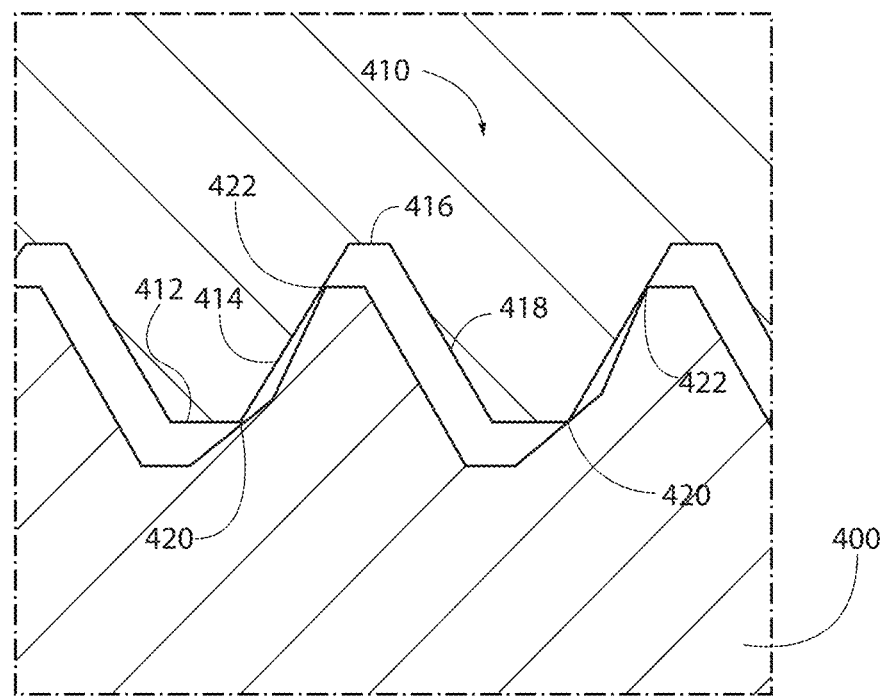
FIG. 8 is a detail view of the third embodiment of a threaded fastener engaged to a component.

Referring now to FIGS. 7-8, a thread 400 of a third embodiment of a threaded fastener is illustrated. The crest portion 402 oriented at a crest angle δ of approximately −5° to 5° relative to the longitudinal axis of the fastener. The crest angle δ may also be approximately 0°. The leading flank 404 is oriented at a lead angle α of approximately 20° to 40° relative to the normal axis of the fastener. The lead angle α may also range from 22° to 38°, 24° to 36°, 26° to 34°, 28° to 32°, or approximately 30°. The root portion of the thread 400 includes a first root portion 406 and a second root portion 407. The first root portion 406 is oriented at a first root angle $\rho_1$ of approximately 0° relative to the longitudinal axis of the fastener. The second root portion 407 is oriented at a second root angle $\rho_2$ of approximately 30° to 50° relative to the longitudinal axis of the fastener. The second root angle $\rho_2$ may also range from 32° to 48°, 34° to 46°, 36° to 44°, 38° to 42°, or approximately 40°. The trailing flank 408 is oriented at trail angle β of approximately 14° to 34° relative to the normal axis. The trail angle β may also range from 16° to 32°, 18° to 30°, 20° to 28°, 22° to 26°, or is approximately 24°.

Referring to FIG. 8, like the second embodiment previously discussed, the thread 400 provides two-point contact with a mating thread 410, which improves the vibration resistance of the threaded fastener. For purposes of illustration, the mating thread 410 is illustrated a symmetric thread having a crest portion 412, a first flank 414, a root portion 416, and a second flank 418. The first flank 414 and the second flank 418 are oriented at approximately 60° relative to the normal axis, while the crest portion 412 and root portion 416 are oriented at approximately 0° relative to the longitudinal axis. This configuration is common in commercially available screws and nuts.

When the thread 400 is mated with the mating thread 410, the configuration of the thread 400 results in two points of contact as shown in FIG. 8. The second root portion 407 of the thread 400 contacts the crest portion 412 of the mating thread 410 at a first contact point 420. The crest portion 402 of the thread 400 contacts the first flank 414 of the mating thread 410 at a second contact point 422.

As described above, the multi-point contact between the thread 400 and the mating thread 410 improves vibration resistance of the threaded fastener by limiting vibration induced movement. By locking both the crest portion and the root portion of the thread with the mating thread, the potential for movement as a result of vibration is significantly reduced as shown by the test results below.

Referring generally to FIGS. 3-8, the embodiments of the thread for the presently disclosed threaded fastener have been described by angle relative to the longitudinal axis or normal axis of the threaded fastener. The phrase "approximately X°" is intended to mean a design or specified value of X, while allowing for standard manufacturing tolerances and variations. In one example, manufacturing tolerances and variations may be up to and including +/−0.5°. In various embodiments, the angles defining each portion of the thread configuration may vary by +/−1°, +/−2.5°, +/−5°, while still achieving the improved vibration resistance.

Moreover, the variation of angle need not be uniform across all portions of the thread configuration. For example, in one embodiment, the crest portion and root portion may vary by +/−5° from the angles illustrated above, while the leading flank and trailing flank are held within +/−1° of the angles illustrated above. All such variations are contemplated as within the scope of this disclosure. In addition, a range defined by "+/−" a certain value are intended to be inclusive of the end points of the range. For example, "0°+/−5°" means −5° to +5° inclusive.

Referring now to FIGS. 9-11, the second end portions of the embodiments of the threaded fasteners illustrated in FIGS. 3-8 are depicted. In some embodiments, the major diameter (defined by the maximum radial extent of the crest portion of the thread) tapers over at least the last two revolutions of the threaded portion adjacent the second end of the fastener. To facilitate engagement of a threaded fastener, such as engagement of a screw or bolt into a threaded hole, the second end of the threaded fastener may be tapered.

Referring to FIG. 9, the threaded fastener 100 has thread 200. Adjacent the second end 104, the crest portion 202, 202' tapers at a taper angle θ of approximately 30° as shown. Referring to FIG. 10, the threaded fastener 100 has thread 300. Adjacent the second end 104, the crest portion 302, 302' tapers at a taper angle θ of approximately 30° as shown. Referring to FIG. 11, the threaded fastener 100 has thread 400. Adjacent the second end 104, the crest portion 402, 402' tapers at a taper angle θ of approximately 30° as shown. In all embodiments, the taper may extend for at least the last two revolutions of the thread. In some embodiments, the taper angle θ is between 15° and 30°, and the taper may extend for three or more revolutions of the thread as may be desired. The taper angle θ may also be in the range of 0° to 60°, or 5° to 55°, or 10° to 50°, or 15° to 45°, or 20° to 40°, or 25° to 35°, or approximately 30°. In yet other embodiments, the maximum diameter of the crest portion of the thread is defined by a radius (R) greater than the major diameter of the fastener and defines a first taper angle of between 15° and 30° from the second end to the first crest portion 202',302',402' adjacent the second end, and defines a second taper angle from the first crest portion 202',302', 402' to the second crest portion 202, 302, 402 from the second end which is less than the first taper angle θ.

In yet other embodiments, the first end of the threaded fastener includes a radially extending surface 112. In an embodiment, the radially extending surface is the underside of a head of the fastener, such as illustrated in FIG. 2. In other embodiments, the threaded fastener is a nut (or similar internally threaded structure) and the radially extending surface is the top surface of the fastener configured to mate with a component. In each embodiment, the radially extending surface may include a plurality of serrations configured to further improve the vibration resistance of the presently disclosed threaded fastener.

The presently disclosed threaded fastener may be made from low carbon steel, alloy steel, aluminum, brass or other materials as desired. The threaded fasteners may be made of a material for assembling parts made from plastic, brass, aluminum, wood, concrete, steel, or other component materials.

Figure 12:
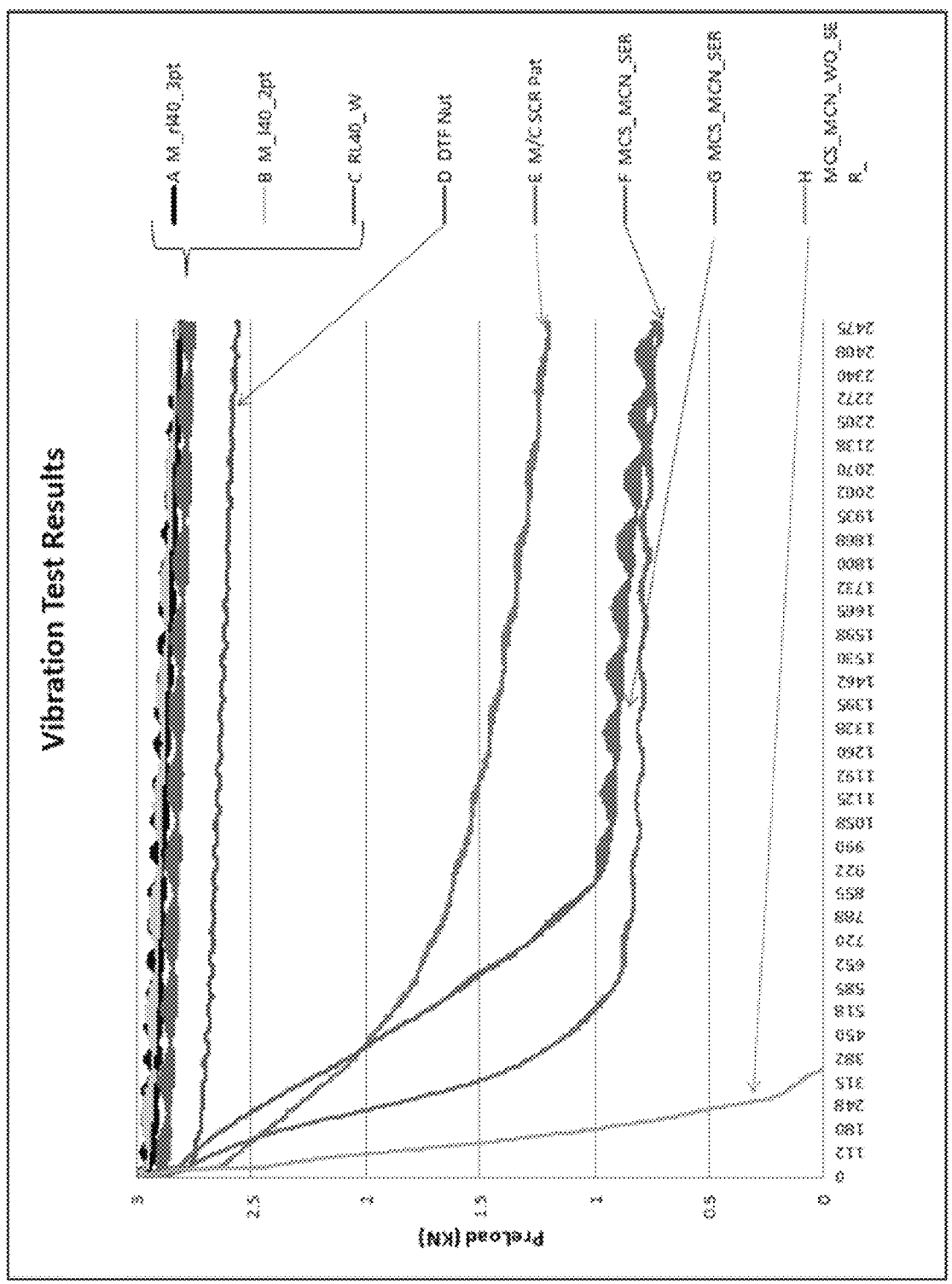
FIG. 12 is a graph of vibration test results for embodiments of the threaded fastener and comparative fastener samples.
Figure 13:
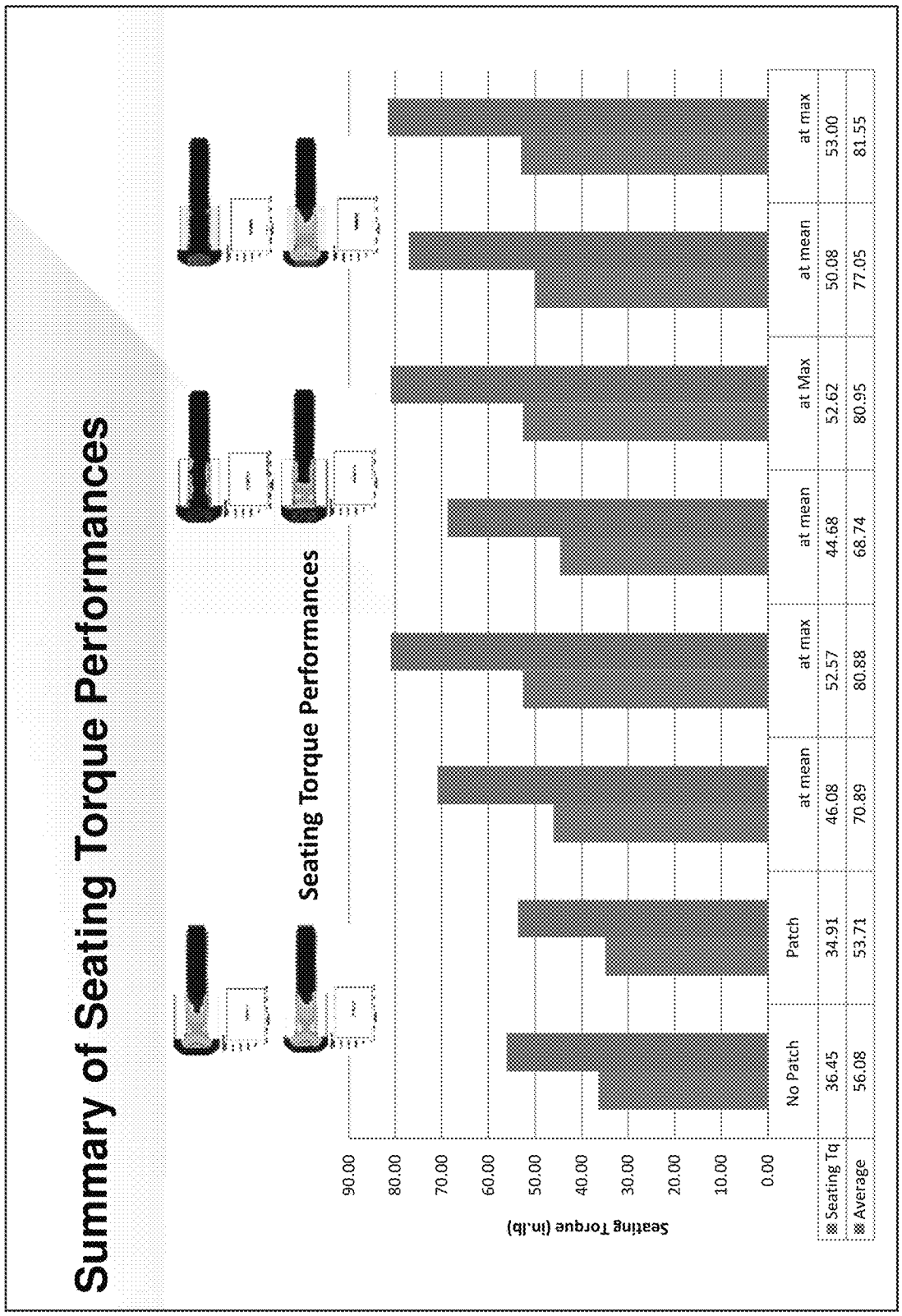
FIG. 13 is a chart of seating torque test results for embodiments of the threaded fastener and a comparative fastener sample.
Figure 14:
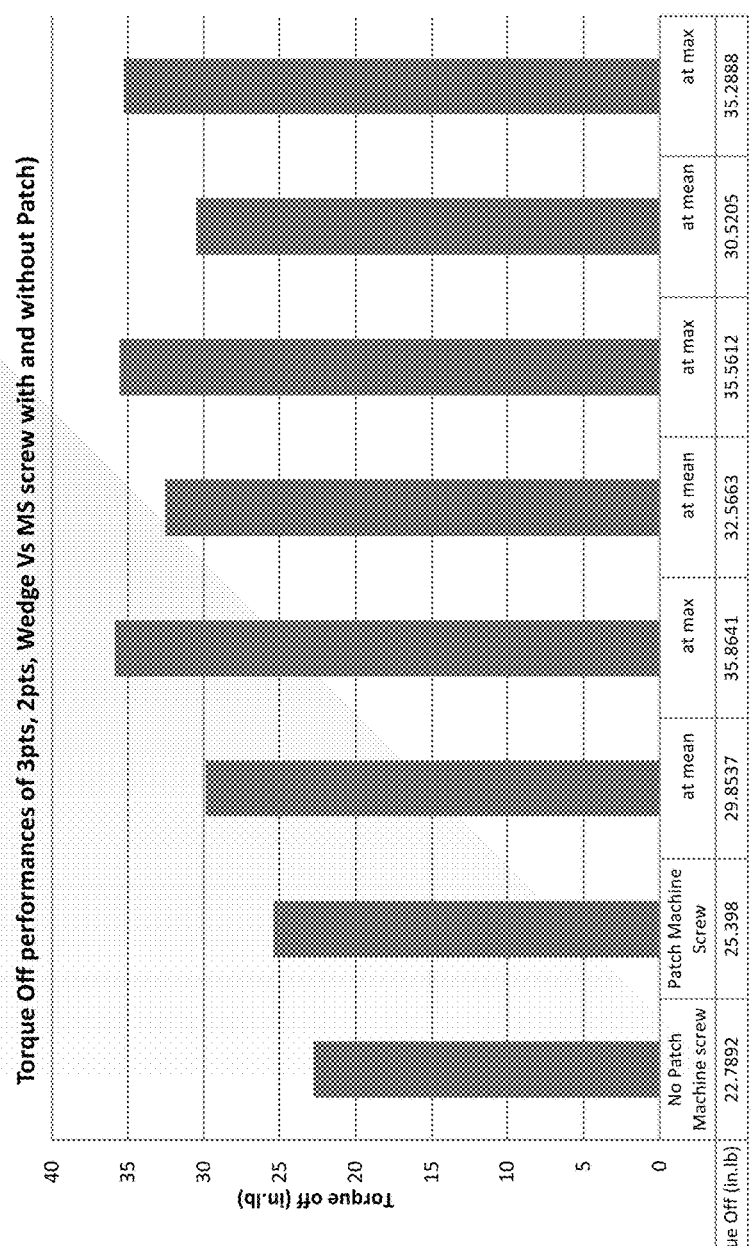
FIG. 14 is a chart of torque off test results for embodiments of the threaded fastener and a comparative fastener sample.

Experimental samples of the presently disclosed fasteners were produced and tested compared with a selection of commercially available comparative fasteners. The test results are illustrated in FIGS. 12-14 and discussed below. Samples A-C are embodiments of the presently disclosed threaded fastener. Sample A is a fastener having a thread form configured as shown in FIGS. 3-4. Sample B is a fastener having thread form configured as shown in FIGS. 5-6. Sample C is a fastener having a thread form as shown in FIGS. 7-8.

The selection of commercially available comparative fasteners are designated as Samples D-H. Sample D is a commercially available, machine screw with serrations on the underside of the head portion and a vibration resistant nut sold under the trademark DTFLock. Sample E is a commercially available machine screw with a commercially available anti-vibration patch, serrations on the underside of the head portion, and a standard nut. Sample F is a commercially available machine screw mated with a nut having class 10 serrations. Sample G is another commercially available machine screw mated with a nut having serrations. Sample H is a commercially available machine screw mated with a nut without serrations.

The selected fasteners were tested for vibration loosening in a vibration test conducted at 0.25 mm amplitude and 10 Hz frequency for 2500 cycles. As shown in FIG. 12, the presently disclosed fastener performed better than each of the commercial available comparative fasteners. FIG. 12 shows a plot of the vibration test results as the number of cycles increased from zero to 2500. Each fastener was installed with preload of 3.0 KN. The fasteners were then subjected to the vibration test at the amplitude and frequency mentioned above and the results monitored. As illustrated in the graph, as the number of cycles increased, all of the sample fasteners loosened due to the vibration. The presently disclosed fasteners, however, outperformed all of the commercially available fasteners, including the anti-vibration fastener Sample D. Table 1 below provides the vibration test performance results for the samples as tested.

TABLE 1

| Vibration Test Results | | | | |
|---|---|---|---|---|
| | Preload (KN) | # Cycles @ 10 Hz | Remaining Preload (KN) | Remaining Preload (%) |
| Sample C (FIGS. 7-8) | 3.0 | 2500 | 2.84 | 94.67 |
| Sample B (FIGS. 5-6) | 3.0 | 2500 | 2.83 | 94.33 |
| Sample A (FIGS. 3-4) | 3.0 | 2500 | 2.80 | 93.33 |
| Comparative Fasteners | | | | |
| Sample D | 3.0 | 2500 | 2.57 | 85.67 |
| Sample E | 3.0 | 2500 | 1.21 | 40.33 |
| Sample F | 3.0 | 2500 | 0.74 | 24.67 |
| Sample G | 3.0 | 2500 | 0.73 | 24.33 |
| Sample G | 3.0 | 2500 | 0.01 | 0.33 |

As shown above, Sample B achieved the best performance in the test with greater than a 10% improvement in vibration resistance as compared to Sample D.

In addition to improved vibration resistance, the presently disclosed fasteners also provide superior pull-out strength, more uniform distribution of stresses, lower drive torque, and better drive torque to failure torque performance, among other benefits.

FIG. 13 is a chart of seating torque. Samples of the disclosed threaded fastener were prepared at both the mean dimensions and maximum dimensions for the selected fastener size. For comparison, a standard machine screw was tested with and without a nylon patch. As shown, each sample of the presently disclosed fastener performed better than machine screws.

FIG. 14 is a chart of torque off test results. Samples of the presently disclosed threaded fastener were prepared at both the mean dimensions and maximum dimensions for the selected fastener size. For comparison, a standard machine screw was tested with and with a nylon patch. As shown, each sample of the presently disclosed fastener performed better than machine screws.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" or "approximately" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This invention has been described with reference to illustrative embodiments and is not meant to be construed in a limiting sense. It will be apparent to one skilled in the art that elements or process steps from one or more embodiments described herein may be used in combination with elements or process steps from one or more other embodiments described herein, and that the present invention is not limited to the specific embodiments provided herein but only as set forth in the accompanying claims. Various modifications of the illustrative embodiments, as well as additional embodiments to the invention will be apparent to persons skilled in the art upon reference to this description.

What is claimed is:

1. A threaded fastener comprising:
a first end, a second end, and a threaded portion extending between the first end and the second end,
wherein the fastener has a longitudinal axis extending through the fastener from the first end to the second end, and a normal axis extending perpendicular to the longitudinal axis, and
wherein the threaded portion has a thread defined by, in series,
a crest portion oriented at an angle of −5° to +20° relative to the longitudinal axis,
a leading flank oriented at an angle of 20° to 40° relative to the normal axis,
a root portion oriented at an angle of 22° to 35° relative to the longitudinal axis, and
a trailing flank oriented at angle of 15° to 27° relative to the normal axis.

2. A threaded fastener comprising:
a first end, a second end, and a threaded portion extending between the first end and the second end,
wherein the fastener has a longitudinal axis extending through the fastener from the first end to the second end, and a normal axis extending perpendicular to the longitudinal axis, and
wherein the threaded portion has a thread defined by, in series,
a crest portion oriented at an angle of 10° to 20° relative to the longitudinal axis,
a leading flank oriented at an angle of 20° to 30° relative to the normal axis,
a root portion oriented at an angle of 25° to 35° relative to the longitudinal axis, and
a trailing flank oriented at angle of 15° to 25° relative to the normal axis.

3. The threaded fastener of claim 2, wherein the thread is defined by, in series,
the crest portion oriented at an angle of 12.5° to 17.5° relative to the longitudinal axis,
the leading flank oriented at an angle of 22.5° to 27.5° relative to the normal axis,
the root portion oriented at an angle of 27.5° to 32.5° relative to the longitudinal axis, and
the trailing flank oriented at angle of 17.5° to 22.5° relative to the normal axis.

4. The threaded fastener of claim 2, wherein the thread is defined by, in series,
the crest portion oriented at an angle of 14° to 16° relative to the longitudinal axis,
the leading flank oriented at an angle of 24° to 26° relative to the normal axis,
the root portion oriented at an angle of 29° to 31° relative to the longitudinal axis, and
the trailing flank oriented at angle of 19° to 21° relative to the normal axis.

5. The threaded fastener of claim 2, wherein the thread is defined by, in series,
the crest portion oriented at an angle of approximately 15° relative to the longitudinal axis,
the leading flank oriented at an angle of approximately 25° relative to the normal axis,
the root portion oriented at an angle of approximately 30° relative to the longitudinal axis, and
the trailing flank oriented at angle of approximately 20° relative to the normal axis.

6. The threaded fastener as claimed in claim 2, wherein the major diameter of the crest portion of the threaded portion tapers at approximately 30° over at least the last two revolutions of the threaded portion adjacent the second end.

7. The threaded fastener as claimed in claim 2, wherein the threaded portion is externally threaded.

8. The threaded fastener as claimed in claim 2, wherein the threaded portion is internally threaded.

9. The threaded fastener as claimed in claim 2, wherein the first end comprises external drive surfaces.

10. The threaded fastener as claimed in claim 2, wherein the first end comprises internal drive surfaces.

11. The threaded fastener as claimed in claim 2, wherein the first end comprises a recess into a shank of the threaded fastener that defines internal drive surfaces.

12. The threaded fastener as claimed in claim 2, wherein the first end comprises a radially extending surface that includes a plurality of serrations.

13. A threaded fastener comprising:
a first end, a second end, and a shank extending between the first end and the second end, wherein the fastener has a longitudinal axis extending through the fastener from the first end to the second end, and a normal axis extending perpendicular to the longitudinal axis, and wherein the threaded portion has a thread defined by, in series,
- a crest portion oriented at an angle of −5° to 5° relative to the longitudinal axis,
- a leading flank oriented at an angle of 25° to 35° relative to the normal axis,
- a first root portion oriented at an angle of −5° to 5° relative to the longitudinal axis,
- a second root portion oriented at an angle of 35° to 45° relative to the longitudinal axis, and
- a trailing flank oriented at angle of 19° to 29° relative to the normal axis.

14. The threaded fastener of claim 13, wherein the thread is defined by, in series,
- the crest portion oriented at an angle of −2.5° to 2.5° relative to the longitudinal axis,
- the leading flank oriented at an angle of 27.5° to 32.5° relative to the normal axis,
- the first root portion oriented at an angle of −2.5° to 2.5° relative to the longitudinal axis,
- the second root portion oriented at an angle of 47.5° to 42.5° relative to the longitudinal axis, and
- the trailing flank oriented at angle of 21.5° to 26.5° relative to the normal axis.

15. The threaded fastener as claimed in claim 14, wherein the first end comprises a recess into a shank of the threaded fastener that defines internal drive surfaces.

16. The threaded fastener of claim 13, wherein the thread is defined by, in series,
- the crest portion oriented at an angle of −1° to 1° relative to the longitudinal axis,
- the leading flank oriented at an angle of 29° to 31° relative to the normal axis,
- the first root portion oriented at an angle of −1° to 1° relative to the longitudinal axis,
- the second root portion oriented at an angle of 39° to 41° relative to the longitudinal axis, and
- the trailing flank oriented at angle of 23° to 25° relative to the normal axis.

17. The threaded fastener as claimed in claim 16, wherein the first end comprises a radially extending surface that includes a plurality of serrations.

18. The threaded fastener of claim 13, wherein the thread is defined by, in series,
- the crest portion oriented at an angle of approximately 0° relative to the longitudinal axis,
- the leading flank oriented at an angle of approximately 30° relative to the normal axis,
- the first root portion oriented at an angle of approximately 0° relative to the longitudinal axis,
- the second root portion oriented at an angle of approximately 40° relative to the longitudinal axis, and
- the trailing flank oriented at angle of approximately 24° relative to the normal axis.

19. The threaded fastener as claimed in claim 13, wherein the major diameter of the crest portion of the threaded portion tapers at approximately 30° over at least the last two revolutions of the threaded portion adjacent the second end.

20. The threaded fastener as claimed in claim 13, wherein the threaded portion is externally threaded.

21. The threaded fastener as claimed in claim 13, wherein the threaded portion is internally threaded.

22. The threaded fastener as claimed in claim 13, wherein the first end comprises external drive surfaces.

23. The threaded fastener as claimed in claim 13, wherein the first end comprises internal drive surfaces.

\* \* \* \* \*